United States Patent [19]
Latiolais

[11] Patent Number: 6,158,636
[45] Date of Patent: Dec. 12, 2000

[54] WEED TRIMMER SHOULDER STRAP ASSEMBLY

[76] Inventor: Jerry J. Latiolais, P.O. Box 10612, New Iberia, La. 70562

[21] Appl. No.: 09/344,053

[22] Filed: Jun. 25, 1999

[51] Int. Cl.⁷ ....................................................... A45F 3/14
[52] U.S. Cl. .............................. 224/258; 224/257; 30/276
[58] Field of Search .................................... 224/257, 258, 224/259, 607, 610, 611, 612, 614, 616, 617, 148.6; 30/276

[56] References Cited

U.S. PATENT DOCUMENTS

| | | |
|---|---|---|
| 3,781,991 | 1/1974 | Stretton et al. .............................. 30/376 |
| 4,226,021 | 10/1980 | Hoff . |
| 4,630,763 | 12/1986 | Friedman . |
| 4,841,929 | 6/1989 | Tuggle et al. .......................... 30/276 X |
| 5,215,239 | 6/1993 | Walters, Jr. . |
| 5,364,307 | 11/1994 | Shaulis . |
| 5,409,151 | 4/1995 | Freimark ............................... 224/148.6 |
| 5,544,795 | 8/1996 | Perrin .................................. 224/258 X |
| 5,620,121 | 4/1997 | Watson . |
| 5,636,444 | 6/1997 | Nickel . |

FOREIGN PATENT DOCUMENTS

| | | | |
|---|---|---|---|
| 3536676 A1 | 3/1980 | Germany ............................... | 224/258 |
| 2028624 | 3/1980 | United Kingdom ................... | 224/259 |

*Primary Examiner*—Gregory M. Vidovich
*Attorney, Agent, or Firm*—Kenneth L Tolar

[57] ABSTRACT

A strap assembly for a weed trimmer or similar tool designed to minimize or eliminate the strain associated with lifting and lowering the tool includes a pair of bungee cords each having two opposing ends. The first ends of the cords are coupled with a ring which is removably securable to a hook assembly mounted to the shaft of the weed trimmer. The cord is passed back and forth through a bracket and forms a loop allowing the length of each cord to be varied. Each loop is secured to an end of a shoulder pad. The design assures that the weight of the trimmer is supported by the strap assembly as opposed to the user's arms or wrists, regardless of the position of the trimmer.

4 Claims, 2 Drawing Sheets

WEED TRIMMER SHOULDER STRAP ASSEMBLY

BACKGROUND OF THE INVENTION

The present invention relates to a weed trimmer shoulder strap assembly designed to reduce the strain on a user's arms or shoulders.

DESCRIPTION OF THE PRIOR ART

Weed trimmers typically include an elongated shaft having a pair of handles which are grasped by a user to manipulate the trimmer. Most weed trimmers also include a strap for supporting the trimmer on the user's shoulder. However, the trimmer must often be raised, lowered and shifted to various angles during operation. Accordingly, because the conventional shoulder strap is not stretchable, it must be adjusted so that it contains sufficient slack to allow the trimmer to be moved within a wide range. However, when the trimmer is being used in a raised position, there is substantial slack in the strap such that it no longer supports the weight load of the trimmer. Instead, most of the weight load is then shifted to the user's arms or shoulders. Such activity can be extremely burdensome, especially for the elderly or infirm, in that most weed trimmers are typically heavy. The present invention relates to a uniquely designed weed trimmer shoulder strap assembly that continuously supports the weight of the trimmer as the trimmer is raised and lowered.

Various weed trimmers and shoulder straps exist in the prior art. For example, U.S. Pat. No. 5,636,444 issued to Nickel relates to a cutting device with a frictional brake for selectively stopping the drive shaft.

U.S. Pat. No. 5,620,121 issued to Watson relates to a quick releasing support for line trimmers including a ball and socket bracket for interconnecting the trimmer shaft to a user's body. The ball and socket mechanism allows the shaft to rotate relative to the user and also includes a quick release mechanism for quickly detaching the trimmer from the user.

U.S. Pat. No. 5,364,307 issued to Shaulis relates to an apparatus for centering a flexible drive shaft cable within a cylindrical cable housing on a weed trimmer.

U.S. Pat. No. 5,215,239 issued to Walters, Jr. relates to a weight support harness designed primarily to support the weight of a musical instrument including a pair of shoulder straps attachable to the instrument.

U.S. Pat. No. 4,630,763 issued to Friedman relates to a shoulder strap assembly for a banjo.

U.S. Pat. No. 4,226,021 issued to Hoff relates to a drive and frame shaft assembly for a lawn trimmer.

As indicated above, each of the above harness assemblies are specifically designed for musical instruments while each of the trimmers include conventional shoulder straps. The present invention relates to a uniquely configured shoulder strap assembly for a weed trimmer or similar heavy tool designed to minimize the strain associated with raising and lowering the trimmer. The device includes a shoulder pad having a pair of elastic cord assemblies attached thereto. The cords are securable to the trimmer preventing a user from having to lift and hold the trimmer for prolonged periods of time.

SUMMARY OF THE INVENTION

The present invention relates to a strap assembly for a weed trimmer. The device includes a pair of elongated elastic bungee cords, each having a pair of opposing ends. First ends of the cords are coupled with a ring. Each of the opposing ends is passed back and forth through an adjustment bracket to form a loop that is secured to an end of a shoulder pad. The ring is removably secured to a clamp mechanism mounted on the trimmer shaft. The uniquely designed strap assembly allows a user to adjust each cord to a desired length. If, while mounted on a user's shoulder, the trimmer must be lowered, the user simply presses the trimmer downwardly. As pressure on the trimmer is released, the trimmer will automatically return to its original position. It is therefore an object of the present invention to provide a shoulder strap assembly that minimizes the strain associated with operating a weed trimmer.

It is another object of the present invention to provide a shoulder strap assembly that prevents a user's arms or shoulders from bearing the weight of the weed trimmer.

It is yet another object of the present invention to provide a shoulder strap assembly for a weed trimmer that is easy to use and inexpensive to manufacture. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
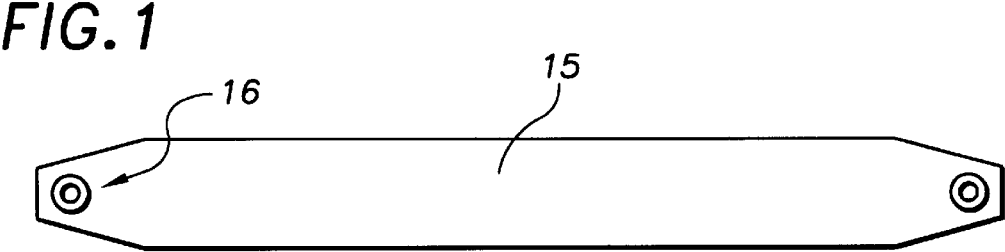
FIG. 1 is a close-up view of the shoulder strap.
Figure 2:
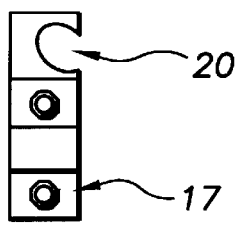
FIG. 2 is a close-up front view of the hook assembly.
Figure 3:
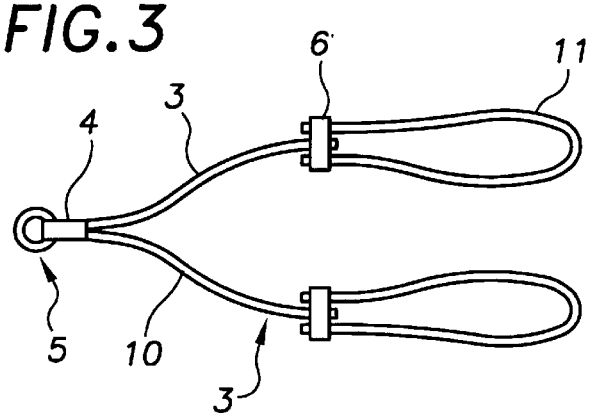
FIG. 3 depicts the cord assembly.
Figure 4:
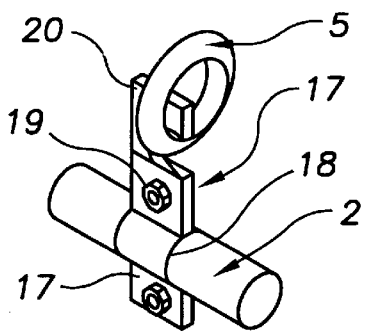
FIG. 4 depicts the hook assembly attached to the trimmer shaft.
Figure 5:
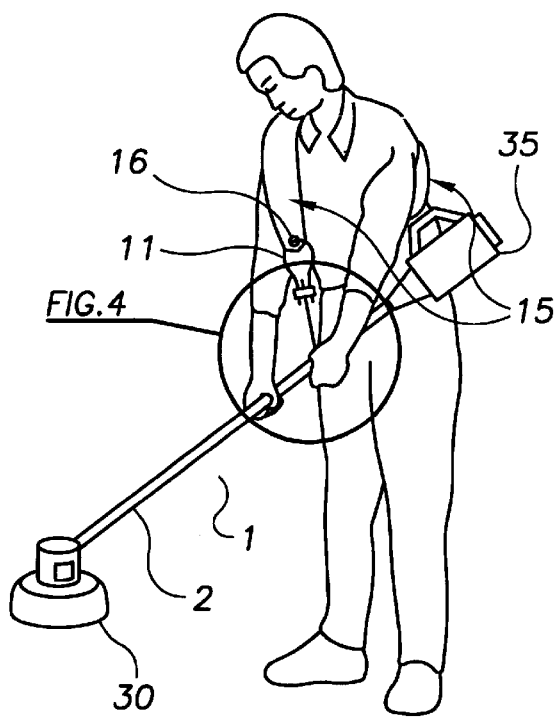
FIG. 5 depicts the strap assembly attached to a conventional weed trimmer and draped over a user's shoulder.

Referring now to FIGS. 1 through 6, the present invention relates a strap assembly for a weed trimmer 1. A conventional weed trimmer 1 typically includes an elongated shaft 2 having a cutting head 30 at one end and a motor 35 at the opposing end. The present invention relates to a strap assembly securable to the shaft of a weed trimmer of the type described above.

The device includes a pair of elastic cords 3, each having first and second ends. The first ends of the cords are joined with a conventional coupling mechanism 4 such as tape, a sleeve or a similar device. A ring 5 is attached to the coupling device for securing the joined ends to a hook mechanism on the trimmer shaft as will be described in more detail below. The opposing end of each cord is threaded back and forth through an adjustment bracket 6 and then folded onto itself to form a loop 11. The length of each cord may be therefore selectively varied using the adjustment bracket.

Figure 6:
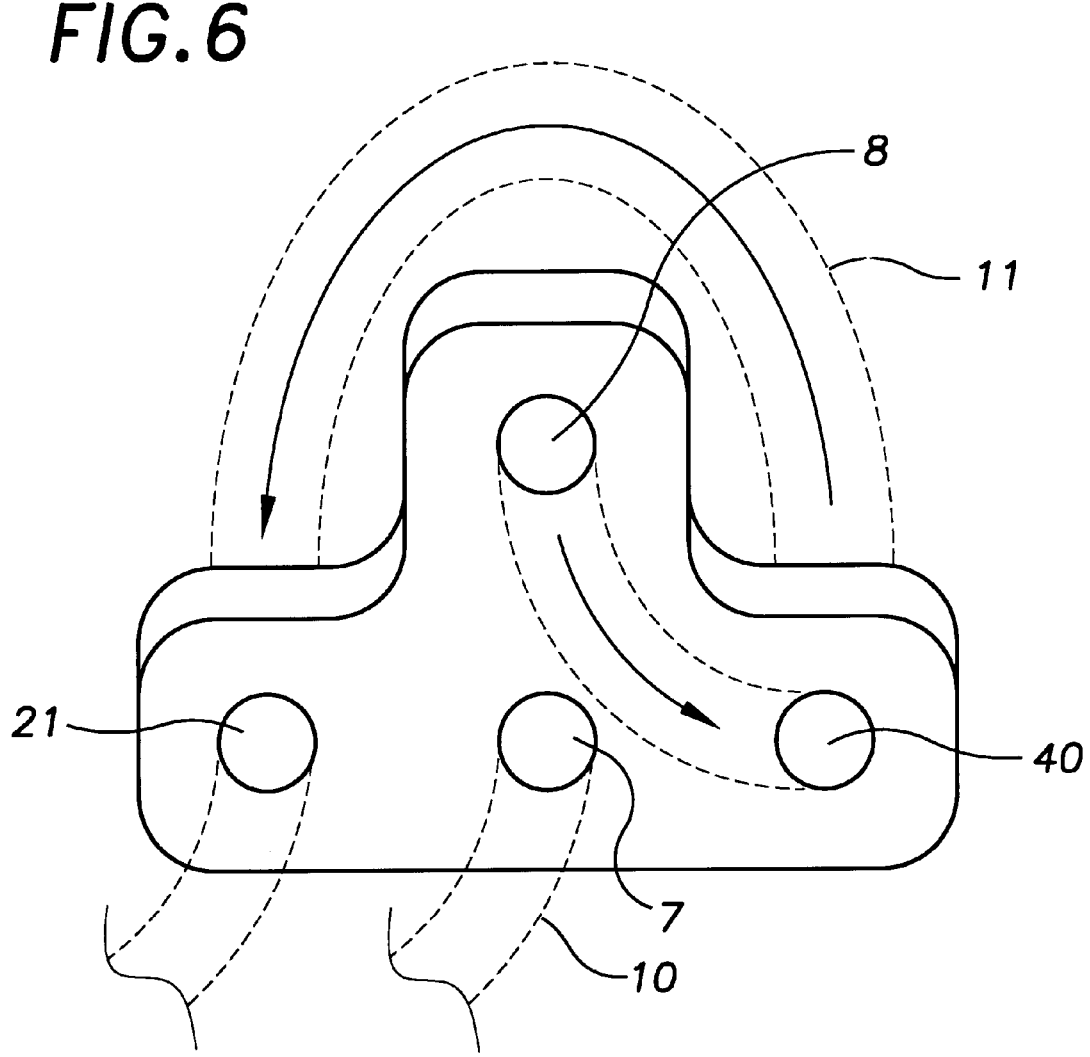
FIG. 6 depicts a detailed view of the adjustment bracket.

Referring now to FIG. 6, the adjustment bracket preferably includes four apertures. Each cord extends through a first aperture 7, loops back through a second aperture 8 and reverses direction again back through a third aperture 40. The remaining portion of the cord is formed into a loop 11 and the second end of the cord is passed through the fourth aperture 21. The cord is secured to each bracket by tying a knot at the end of the cord or attaching a retaining means thereto. Each cord will then include a straight portion 10 on one side of the bracket and the loop 11 on the other. Each adjustment bracket allows the effective length of each cord to be adjusted to fit various size users or to selectively position a weed trimmer relative to the user's body by sliding the adjustment bracket upwardly or downwardly along the length of the cord.

The assembly also includes a shoulder pad 15 having a pair of opposing ends, each end having a grommet 16 adjacent thereto. Each loop 11 passes through one of the grommets adjacent an end of the shoulder pad to secure the shoulder pad to the cord assembly. The shoulder pad is preferably constructed with multiple layers of webbing with a foam layer therebetween.

The ring on the joined ends of the cords is secured to a hook mechanism mounted to the weed trimmer shaft. The hook assembly includes a pair of clamp members 17 each having a U-shaped indention 18 thereon for receiving a portion of the weed trimmer shaft. Each end of the clamp includes an aperture for receiving a fastener means 19. Each clamp is secured to an opposing portion of the shaft and the two clamps are coupled by inserting the fastener means through each set of apertures on the clamp. Disposed between the clamps is a J-shaped hook member 20 to which the metal ring may be attached to quickly secure the strap assembly to the weed trimmer.

The above described device is not to be limited to the exact details of construction as shown and described. Although the device has been shown and described as primarily designed for supporting a weed trimmer, the device may be used with other heavy devices which are typically supported on a user's shoulder. As will also be readily apparent to those skilled in the art, the size, shape and materials of construction of the above described components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A shoulder strap for a weed trimmer comprising:

a shoulder pad having two opposing ends;

a pair of length adjustable elastic cords each having a first end, means for securing said first ends together, said first ends adapted to be removably attached to a weed trimmer shaft, each of said cords formed into a length adjustable loop, each said loop respectively attached to one of said ends of said shoulder pad whereby the size of said loop is variable to adjust the length of said cord.

2. A shoulder strap assembly according to claim 1 wherein the first ends of each cord include a ring secured thereto which is adapted to be removably fastened to a hook mounted on a weed trimmer shaft.

3. A shoulder strap assembly according to claim 2 wherein each said cord is threaded back and forth through an adjustment bracket to form said loop, said bracket slidable along said cord to vary the size of said loop and thus the length of said cord.

4. A shoulder strap assembly according to claim 3 further comprising said hook which includes a pair of clamp members mountable to the trimmer shaft with a J-shaped hook member disposed therebetween for connection with said ring.

* * * * *